United States Patent
Towal

(10) Patent No.: US 11,334,789 B2
(45) Date of Patent: May 17, 2022

(54) FEATURE SELECTION FOR RETRAINING CLASSIFIERS

(71) Applicant: QUALCOMM Incorporated, San Diego, CA (US)

(72) Inventor: Regan Blythe Towal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1011 days.

(21) Appl. No.: 14/838,333

(22) Filed: Aug. 27, 2015

(65) Prior Publication Data

US 2016/0275414 A1     Sep. 22, 2016

Related U.S. Application Data

(60) Provisional application No. 62/164,484, filed on May 20, 2015, provisional application No. 62/134,493, filed on Mar. 17, 2015.

(51) Int. Cl.
*G06N 3/08* (2006.01)
*G06N 20/00* (2019.01)
(Continued)

(52) U.S. Cl.
CPC ............ *G06N 3/08* (2013.01); *G06F 16/51* (2019.01); *G06K 9/6256* (2013.01);
(Continued)

(58) Field of Classification Search
CPC ............ G06F 19/24; G06F 17/3069; G06F 17/30867; G06F 17/3028; G06K 9/62; G06K 9/00288; G06K 9/6284; G06K 9/00496; G06K 9/00536; G06K 9/00543; G06K 9/6201; G06K 9/6218;
(Continued)

(56) References Cited

U.S. PATENT DOCUMENTS 5,835,901 A * 11/1998 Duvoisin, III ......... G06N 3/082
706/19
7,167,849 B2 * 1/2007 Graepel ............... G06K 9/6255
706/20

(Continued)

OTHER PUBLICATIONS

Yadav, B., & Devi, V. S. (2014, December). Novelty detection applied to the classification problem using Probabilistic Neural Network. In Computational Intelligence and Data Mining (CIDM), 2014 IEEE Symposium on (pp. 265-272). IEEE. (Year: 2014).*

(Continued)

*Primary Examiner* — Michael J Huntley
*Assistant Examiner* — Oluwatosin O Alabi
(74) *Attorney, Agent, or Firm* — Seyfarth Shaw LLP

(57) ABSTRACT

A method of managing memory usage of a stored training set for classification includes calculating one or both of a first similarity metric and a second similarity metric. The first similarity metric is associated with a new training sample and existing training samples of a same class as the new training sample. The second similarity metric is associated with the new training sample and existing training samples of a different class than the new training sample. The method also includes selectively storing the new training sample in memory based on the first similarity metric, and/or the second similarity metric.

24 Claims, 10 Drawing Sheets

(51) Int. Cl.
  *G06F 16/51* (2019.01)
  *G06K 9/62* (2022.01)
  *G06N 3/04* (2006.01)
(52) U.S. Cl.
  CPC ........... *G06K 9/6267* (2013.01); *G06N 20/00* (2019.01); *G06N 3/0454* (2013.01)
(58) Field of Classification Search
  CPC .... G06K 9/6219; G06K 9/6267; G06K 9/627; G06K 9/6256; G06N 7/005; G06N 99/005; G06N 3/08; G06N 20/00
  See application file for complete search history.

(56) References Cited

U.S. PATENT DOCUMENTS

| | | | |
|---|---|---|---|
| 7,305,373 | B1 | 12/2007 | Cunningham et al. |
| 7,756,799 | B2 | 7/2010 | Kirshenbaum et al. |
| 7,827,123 | B1 | 11/2010 | Yagnik |
| 8,095,483 | B2 | 1/2012 | Weston et al. |
| 8,725,663 | B1* | 5/2014 | Triantaphyllou ...... G06N 20/00 706/12 |
| 9,111,218 | B1* | 8/2015 | Lewis ...................... G06N 5/04 |
| 10,520,397 | B2* | 12/2019 | Gao .................... G01M 13/028 |
| 2003/0002731 | A1* | 1/2003 | Wersing ............... G06K 9/4628 382/161 |
| 2004/0002931 | A1* | 1/2004 | Platt ..................... G06K 9/6276 706/46 |
| 2006/0050953 | A1 | 3/2006 | Farmer et al. |
| 2007/0127824 | A1 | 6/2007 | Luo et al. |
| 2008/0021851 | A1* | 1/2008 | Alcalde ............. G06F 17/30743 706/21 |
| 2009/0210368 | A1* | 8/2009 | Deo ..................... G06K 9/6267 706/20 |
| 2010/0002920 | A1* | 1/2010 | Cosatto .............. G06K 9/00147 382/128 |
| 2011/0222724 | A1* | 9/2011 | Yang .................. G06K 9/00248 382/103 |
| 2012/0054184 | A1* | 3/2012 | Masud .............. G06F 17/30598 707/737 |
| 2013/0223726 | A1 | 8/2013 | Jiang et al. |
| 2013/0223727 | A1* | 8/2013 | Jiang .................... G06K 9/6217 382/159 |
| 2016/0253466 | A1* | 9/2016 | Agaian ................... G06T 7/246 382/128 |

OTHER PUBLICATIONS

Kuncheva, L. I. (2004, June). Classifier ensembles for changing environments. In International Workshop on Multiple Classifier Systems (pp. 1-15). Springer, Berlin, Heidelberg. (Year: 2004).*
Ou, G., & Murphey, Y. L. (2007). Multi-class pattern classification using neural networks. Pattern Recognition, 40(1), 4-18. (Year: 2007).*
Law, Y. N., & Zaniolo, C. (Oct. 2005). An adaptive nearest neighbor classification algorithm for data streams. In European Conference on Principles of Data Mining and Knowledge Discovery (pp. 108-120). Springer, Berlin, Heidelberg. (Year: 2005).*
Diao, R., Chao, F., Peng, T., Snooke, N., & Shen, Q. (2013). Feature selection inspired classifier ensemble reduction. IEEE transactions on cybernetics, 44(8), 1259-1268. (Year: 2013).*
Czarnowski I: "Cluster-based Instance Selection for Machine Classification", Knowledge and Information Systems, vol. 30, No. 1, Jan. 22, 2011 (Jan. 22, 2011), pp. 113-133, XP055275662, GB ISSN: 0219-1377, DOI 10.1007/s10115-010-0375-z p. 113-p. 121.
International Search Report and Written Opinion—PCT/US2016/022215—ISA/EPO—dated Jun. 16, 2016.
Olvera-Lopez J A., et al., "A Review of Instance Selection Methods", Artificial Intelligence Review, Kluwer Academic Publishers, Do, vol. 34, No. 2, May 27, 2010 (May 27, 2010), pp. 133-143, XP019812207, ISSN: 1573-7462 the whole document.
Wilson D R., et al., "Reduction Techniques for Instance-Based Learning Algorithms", Machine Learning, Kluwer Academic Publishers, Boston, US, vol. 38, No. 3, Mar. 1, 2000 (Mar. 1, 2000), pp. 257-286, XP009090989, ISSN: 0885-6125, DOI: 10.1023/A:1007626913721 p. 257-p. 276.
Garcfa-Pedrajas N., et al., "Scaling Up Data Mining Algorithms: Review and Taxonomy", Springer, Apr. 30, 2012.
Zhai J-H., et al., "Instance Selection Based on Supervised Clustering", 2012 International Conference on Machine Learning and Cybernetics, IEEE, Jul. 17, 2012.
Fabrizio A., et al., "Fast Outlier Detection in High Dimensional Spaces", In: "Advances in Intelligent Data Analysis XIX", Sep. 18, 2002 (Sep. 18, 2022), Springer International Publishing, Cham, XP055800136,13 Pages ISSN 0302-9743, ISBN: 978-3-030-71592-2, vol. 2431, pp. 15-27, DOI: 10.1007/3-540-45681-3_2, Retrieved from the Internet: URL: https://link.springer.com/content/pdf/10.1007/3-540-45681-3_2.pdf., cited in corresponding EP Office Action (EP2016710654).

* cited by examiner

FEATURE SELECTION FOR RETRAINING CLASSIFIERS

CROSS-REFERENCE TO RELATED APPLICATION

The present application claims the benefit of U.S. Provisional Patent Application No. 62/134,493, filed on Mar. 17, 2015 and 62/164,484, filed on May 20, 2015 titled "FEATURE SELECTION FOR RETRAINING CLASSIFIERS," the disclosures of which are expressly incorporated by reference herein in their entirety.

BACKGROUND

Field

Certain aspects of the present disclosure generally relate to machine learning and, more particularly, to systems and methods of feature selection for retraining classifiers.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

According to one aspect of the present disclosure, a method of managing memory usage of a stored training set for classification is described. The method includes calculating at least one of a first similarity metric or a second similarity metric. The first similarity metric is associated with a new training sample and existing training samples of a same class as the new training sample. The second similarity metric is associated with the new training sample and existing training samples of a different class than the new training sample. The method also includes selectively storing the new training sample in memory based on the first similarity metric, and/or the second similarity metric. The selective storing of the new training sample decreases the memory requirement for the updated stored training set.

According to another aspect of the present disclosure, an apparatus manages memory usage of a stored training set for classification. The apparatus has means for calculating at least one of a first similarity metric or a second similarity metric. The first similarity metric is associated with a new training sample and existing training samples of a same class as the new training sample. The second similarity metric is associated with the new training sample and existing training samples of a different class than the new training sample. The apparatus also includes means for selectively storing the new training sample in memory based on the first similarity metric, the second similarity metric or a combination thereof. The selective storing of the new training sample decreases the memory requirement for the updated stored training set.

Another aspect discloses an apparatus for managing memory usage of a stored training set for classification and includes a memory and at least one processor coupled to the memory. The processor(s) is configured to calculate at least one of a first similarity metric or a second similarity metric. The first similarity metric is associated with a new training sample and existing training samples of a same class as the new training sample. The second similarity metric is associated with the new training sample and existing training samples of a different class than the new training sample. The processor(s) is further configured to selectively store the new training sample in memory based on the first similarity metric, the second similarity metric or a combination thereof. The selective storing of the new training sample decreases the memory requirement for the updated stored training set.

Yet another aspect discloses a computer-readable medium for managing memory usage of a stored training set for classification. The computer-readable medium includes program code to calculate at least one of a first similarity metric or a second similarity metric. The first similarity metric is associated with a new training sample and existing training samples of a same class as the new training sample. The second similarity metric is associated with the new training sample and existing training samples of a different class than the new training sample. The program code further includes program code to selectively store the new training sample in memory based on the first similarity metric, the second similarity metric or a combination thereof. The selective storing of the new training sample decreases the memory requirement for the updated stored training set.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
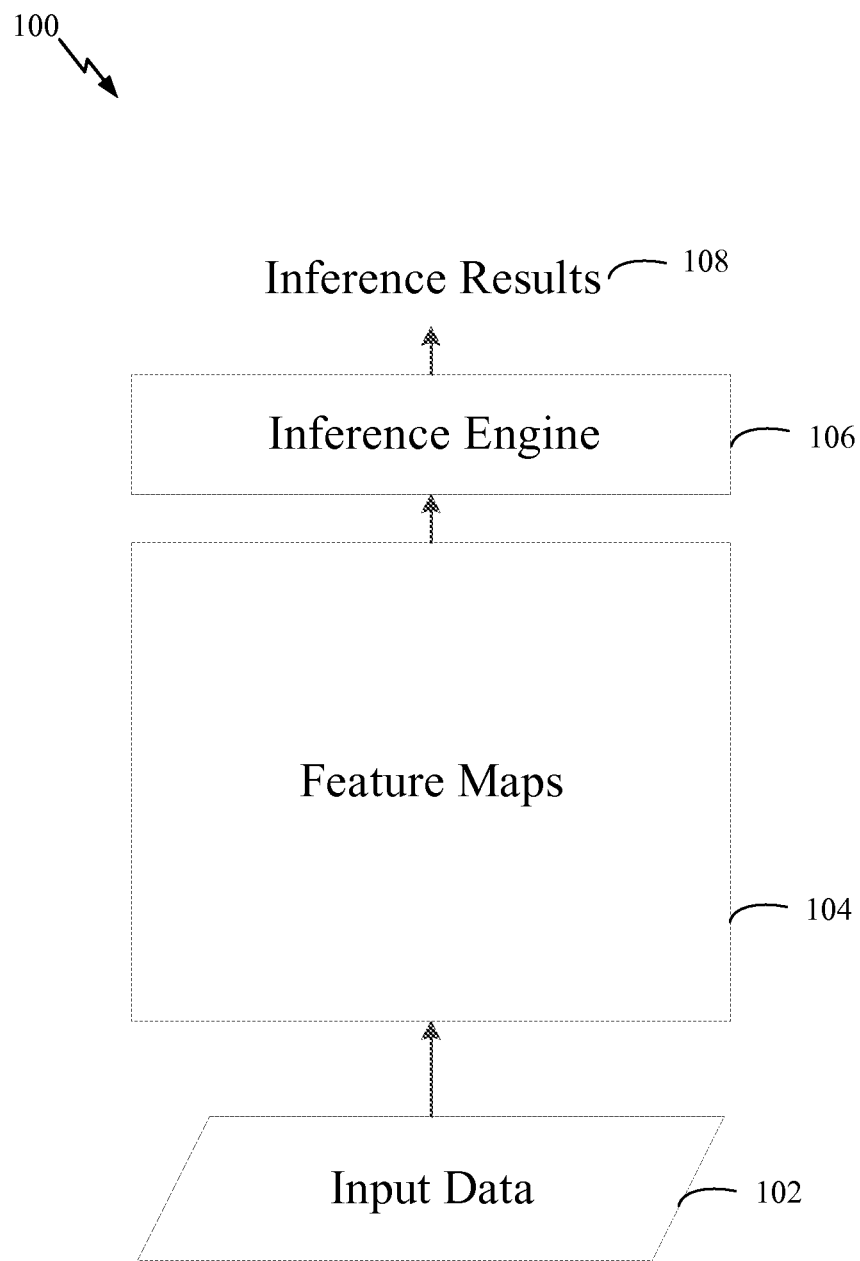
FIG. 1A illustrates an exemplary classifier in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Feature Selection for Retraining Classifiers

The present disclosure is directed to selection of features and data samples for use in retraining classifiers. A classifier is a device or system that receives an input (e.g., an observation) and identifies one or more categories (or features) to which that input belongs. In some aspects, the identification may be based on a training set of data including observations for which a classification is known.

A classifier may take various forms including support vector networks and neural networks. For example, in some aspects, a classifier may take the form of a deep neural network such as a deep belief network (DBN) or a deep convolutional network.

FIG. 1A is a high-level block diagram illustrating an exemplary architecture for a classifier 100 in accordance with aspects of the present disclosure. The classifier 100 may be trained using a training set of examples for which a classification is known.

The exemplary classifier 100 may receive input data 102. The input data 102 may comprise an observation such as an image, a sound or other sensory input data. The input data may be supplied via an audiovisual device such as a camera, voice recorder, microphone, smartphone, or the like.

The input data may be supplied to a learned feature map 104. The learned feature map 104 may include features and other characteristics for a known data classification. For example, in an optical character recognition application, the feature map may comprise an array of shapes associated with letters of the alphabet. The learned feature maps may be used to extract one or more features from the input data (e.g., an image). The extracted features from the input data 102 may then be supplied to an inference engine 106, which may determine one or more classifications for the input data 102 based on the extracted features. The inference engine 106 may output the determined classification as an inference result 108.

In one example, the classifier 100 may be configured to classify image data 102. The classifier 100 may be trained using a set of images of known animals. Accordingly, a new image (input data) may be supplied to the learned feature map, which may include image characteristics from the training data set of known animals. For example, the feature map 104 may include tusks, claws, tails, facial features or other defining characteristics. The input image data 102 may be compared to the feature map 104 to identify a set of features in the input image data 102. The set of features may then be supplied to the inference engine 106 to determine a classification for the image. For example, where the input image 102 includes a four-legged animal with a mane about the face and a tasseled tail, the image may be classified as a lion.

The classifier 100 may be configured to make more or less precise classifications (e.g., simply determining that the animal is feline or more specifically determining that the lion is an Asiatic or Masai lion) according to design preference in view of computation, power and/or other considerations.

Classifiers use training data to learn models of the data. Some amount of data for each class is preserved to ensure that future changes to the classifier do not disrupt the learned class representations. However, storing all of the data samples for a given class is not scalable in situations where memory is highly constrained, as on mobile devices. Instead, it is often possible to choose the data samples for retraining based on how similar the samples are to each other both within and between classes.

In accordance with aspects of the present disclosure, a data sample may be added to a training set based on a similarity metric. The data samples may be stored or may be provided sequentially via a data stream from an external source (e.g., a mobile device, digital camera, video recording device, a streaming media input or other data source). In some aspects, data samples that are not added may be discarded, for data storage considerations, for example. For instance, where the data samples are images provided from a large number of mobile devices, it may be difficult to store each of the images supplied. In such a case, data storage capacity may be quickly depleted if all of the received image data samples were stored before deciding whether to add them to a training set.

The similarity metric may, for example, comprise a distance metric relative to other samples, either within the same class or different classes of the existing training set. In some aspects, an existing data sample within the training set may also be removed based on the similarity metric.

In some aspects, a limit on the number of feature vectors stored for each subject (e.g., 10) may be applied. In this case, new feature vectors may be added until the limit or maximum number is reached. When a user attempts to add a new feature vector after the maximum has been reached, a determination may be made on whether it should be added. For example, the determination may be made based on the similarity of the new feature vector as compared with existing feature vectors.

If it is determined that the new feature vector should be added, a capacity check may be performed to determine if there is sufficient space available to store the new feature vector. If there is insufficient space or if the feature vector limit has been reached, a determination may be made to identify which existing feature vector should be removed and replaced by the new feature vector. Otherwise, the new feature vector will not be added.

The determination of whether to add a new sample or feature vector to the training dataset may be based on a similarity metric. In some aspects, the similarity metric may comprise a redundancy measure relative to an existing or current sample or feature vector within a class. If the similarity metric indicates that the new sample is redundant with current samples within the class, the new sample may be rejected.

In another aspect, the similarity metric may comprise a proximity measure between the new sample and current samples in the same class and/or between the new sample and samples in all other classes. If the sample is on a class boundary, for example, far from current class samples, or very near samples from another class, the sample may be added and stored.

Redundancy Criterion

To determine if a new sample is more redundant than any pair of existing samples within a class, an adjacency matrix for the class of interest may be calculated. The adjacency matrix may represent a distance between every pair of points in a class. The distance may, for example, comprise a Euclidean distance, L2-norm (least squares) Mahalanobis distance, L1-norm (least absolute deviation), cosine distance or other distance metric. A minimum distance between a pair of points (samples) within the class may be determined. The minimum distance value (e.g., the preexisting minimum distance) may be compared to the smallest distance in the row of the matrix representing the distance between the new sample and the existing samples. If the new sample's closest distance is smaller than the preexisting minimum distance, the new sample may be determined to be redundant and may be rejected. On the other hand, if the new sample's closest distance is larger than the preexisting minimum distance, the new sample may be stored.

To reduce processing time, in some aspects, the minimum distance between any two points in the class may be stored for subsequent comparisons. This minimum distance may be updated each time the samples in the class are changed. Using the stored minimum distance, when considering a new sample, only the distances from the new sample to each existing sample may be calculated, thereby reducing the computational complexity. Furthermore, when a new sample is added, the stored minimum distance may simply be updated to the already calculated minimum distance for this new sample, upon confirmation that the current sample being replaced is not the current sample to which the new sample was closest.

Class Boundary

In some aspects, a sample may be added and/or removed based on the sample's proximity to a true class boundary. The inclusion of a sample that is near a true classification boundary may be beneficial as it may enable finer classifications of new objects.

The Far Out Criterion

One way to determine whether a sample is near a class's true boundary is to determine whether a new sample lies further away from existing samples than any single existing samples. This may be determined by calculating the adjacency matrix of distances between every pair of points within a class and then taking the sum of all of the distances from a single point to all other neighbors. Points with larger sum distances will be more likely to lie on the true class boundaries. The sum distance of the new sample may be compared to the sum distances for the existing samples. If the new sample has a larger sum distance than any of the existing samples' sum distances, then the new sample may be added. On the other hand, if the new sample has a smaller sum distance than any of the existing samples' sum distances, then the new sample may be rejected.

Intuitively, this may be visualized by imagining a circular cluster of data points. A point near the center of the cluster may have distances to all other points that are less than the radius of the circle formed by the cluster. Summing these distances may produce a number that is no larger than nclass*radius, where nclass is the number of points in the class. Conversely, a point near the outside of the circle, however, may have distances to neighbors that are distributed between zero (0) and the diameter of the circle. Points that lie within the circle's radius length from the outer point may have distances that are less than the radius length, but those outside of the circle's radius length may have larger distances. The amount of overlap between two adjacent circles with the same radii placed exactly one radius apart is approximately ⅓. Thus, for the point on the outside of the circle, approximately ⅓ of the distances will be less than the radius length and ⅔ will be greater than the radius length, meaning that their sum may be greater than the sum of distances for the central point.

In some aspects, the maximum sum distance for all of the existing points may be stored and used to determine whether to add and/or remove a sample. As such, when a new sample is presented, only the sum distance for the new point is calculated and compared to the stored sum distance. If the sample is added, then the stored sum distance may be updated.

The Neighboring Class

In addition to keeping samples that are on the edges of the class from the class's point of view, the selection may also be biased to retain or add samples that will help build informative boundaries between classes. To do this, new samples closest to the neighboring classes' samples may be preferentially added (or retained). In this case, to determine whether to add the new sample, the adjacency matrix between the class of interest's samples and all of the other class' samples may be computed. The proximity of the new sample to points of another class may be compared to a proximity of the new sample to any of the preexisting points.

Again, the computational complexity may be reduced from quadratic to linear time by storing the minimum distance from any preexisting class point to any other class point for each class. Accordingly, only the distance from the new point to all other class' points may be computed for purposes of the comparison.

Finding a Sample to Replace

If a new point is to be added when the storage limit has been reached, a sample may be removed to make room for the new sample. In general, it may be beneficial to remove samples on the inside of the class representation because those points are less likely to provide information about the class boundaries. Following the same logic as above for the far out criterion, the point with the smallest sum distance to all of its neighbors within a class may be removed, for example.

Exemplary pseudo code is provided below to further illustrate a method of feature selection for retraining classifiers in accordance with aspects of the present disclosure.

```
# stored
# N = number of classes
min_pair_dist = 1xN vector
min_sum_dist = 1xN vector
max_sum_dist = 1xN vector
min_other_dist = 1xN vector
# when new sample comes in
if new_sample:
    i = class of new sample
    keep = False
    within_distances = euclidean(new_sample, class[i]_samples)
    new_pair_dist = min(within_distances)
    if new_pair_dist > min_pair_dist[i]
        keep = True
        min_pair_dist[i] = new_pair_dist
    else
        new_sum_distance = sum(within_distances)
        if new_sum_distance > max_sum_dist[i]
            keep = True
        else
            new_other_dist = min(euclidean(new_sample,
            class[not(i)]_samples))
            if new_other_dist < min_other_dist[i]
                keep = True
                min_other_dist[i] = new_other_dist
    if keep == True
        del_sample = min_sum_dist[i]
        # remove del_sample and replace with new_sample
        sum_distances = sum(euclidean(class[i]_samples, class[i]_samples))
        # only update distances that have changed in above
        max_sum_dist[i] = max(sum_distances)
        min_sum_dist[i] = find(min(sum_distances))
```

Figure 1B:
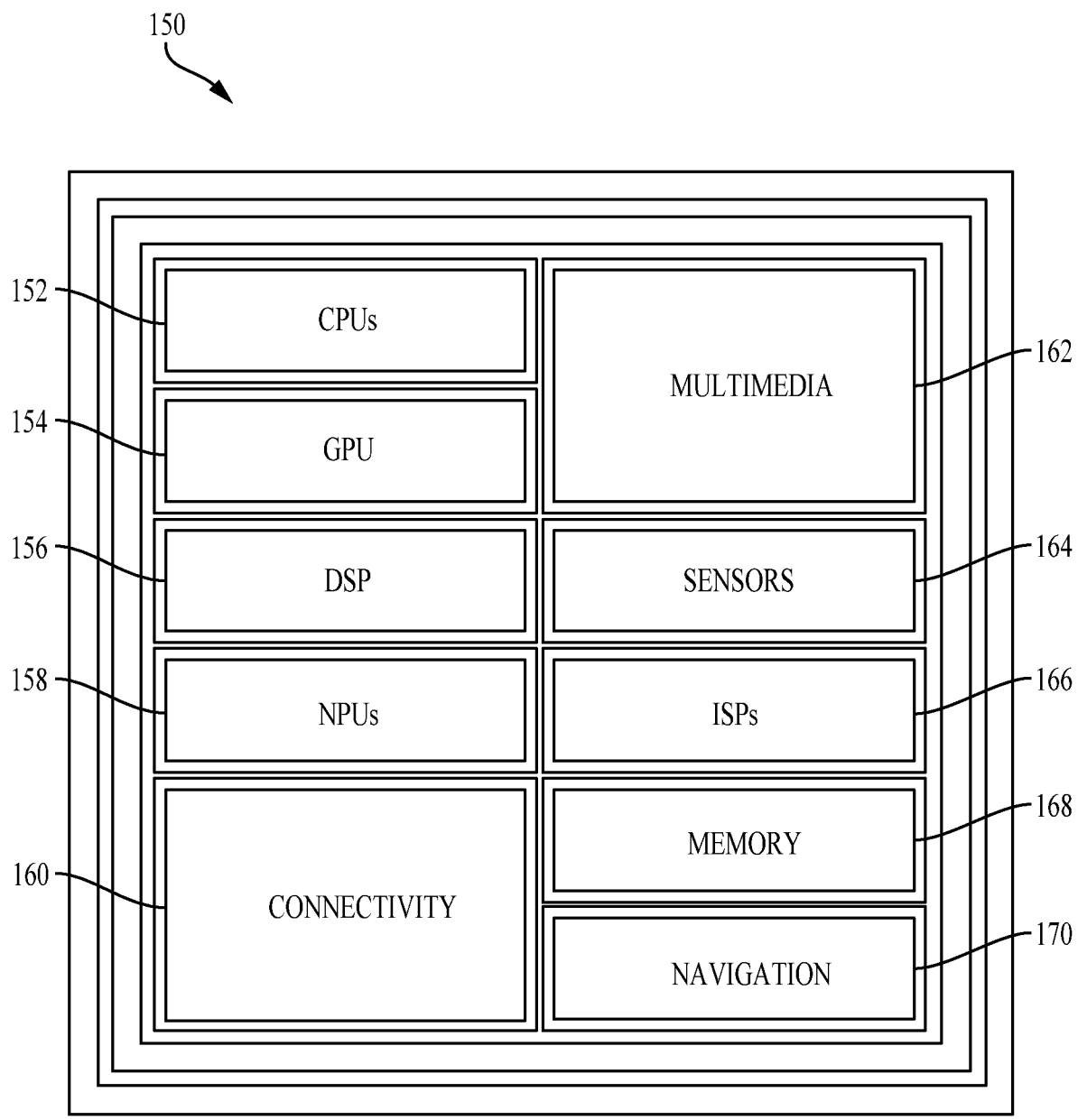
FIG. 1B illustrates an example implementation of designing a neural network using a system-on-a-chip (SOC), including a general-purpose processor in accordance with certain aspects of the present disclosure.

FIG. 1B illustrates an example implementation of the aforementioned updating of a training set stored in memory for classification using a system-on-a-chip (SOC) 150, which may include a general-purpose processor (CPU) or multi-core general-purpose processors (CPUs) 152 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 158, in a memory block associated with a CPU 152, in a memory block associated with a graphics processing unit (GPU) 154, in a memory block associated with a digital signal processor (DSP) 156, in a dedicated memory block 168, or may be distributed across multiple blocks. Instructions executed at the general-purpose processor 152 may be loaded from a program memory associated with the CPU 152 or may be loaded from a dedicated memory block 168.

The SOC 150 may also include additional processing blocks tailored to specific functions, such as a GPU 154, a DSP 156, a connectivity block 160, which may include fourth generation long term evolution (4G LTE) connectivity, unlicensed Wi-Fi connectivity, USB connectivity, Bluetooth connectivity, and the like, and a multimedia processor 162 that may, for example, detect and recognize gestures. In one implementation, the NPU is implemented in the CPU, DSP, and/or GPU. The SOC 150 may also include a sensor processor 164, image signal processors (ISPs), and/or navigation 170, which may include a global positioning system.

The SOC may be based on an ARM instruction set. In an aspect of the present disclosure, the instructions loaded into the general-purpose processor 152 may comprise code for calculating one or both of a first similarity metric and a second similarity metric. The first similarity metric is associated with the new training sample and existing training samples of a same class as the new training sample. The second similarity metric is associated with the new training sample and existing training samples of a different class than the new training sample. The instructions loaded into the general-purpose processor 152 may also comprise code for selectively storing the new training sample in memory based on the first similarity metric and/or the second similarity metric. By selectively storing the new training sample, the memory requirement for the updated stored training set can be decreased.

Figure 2:
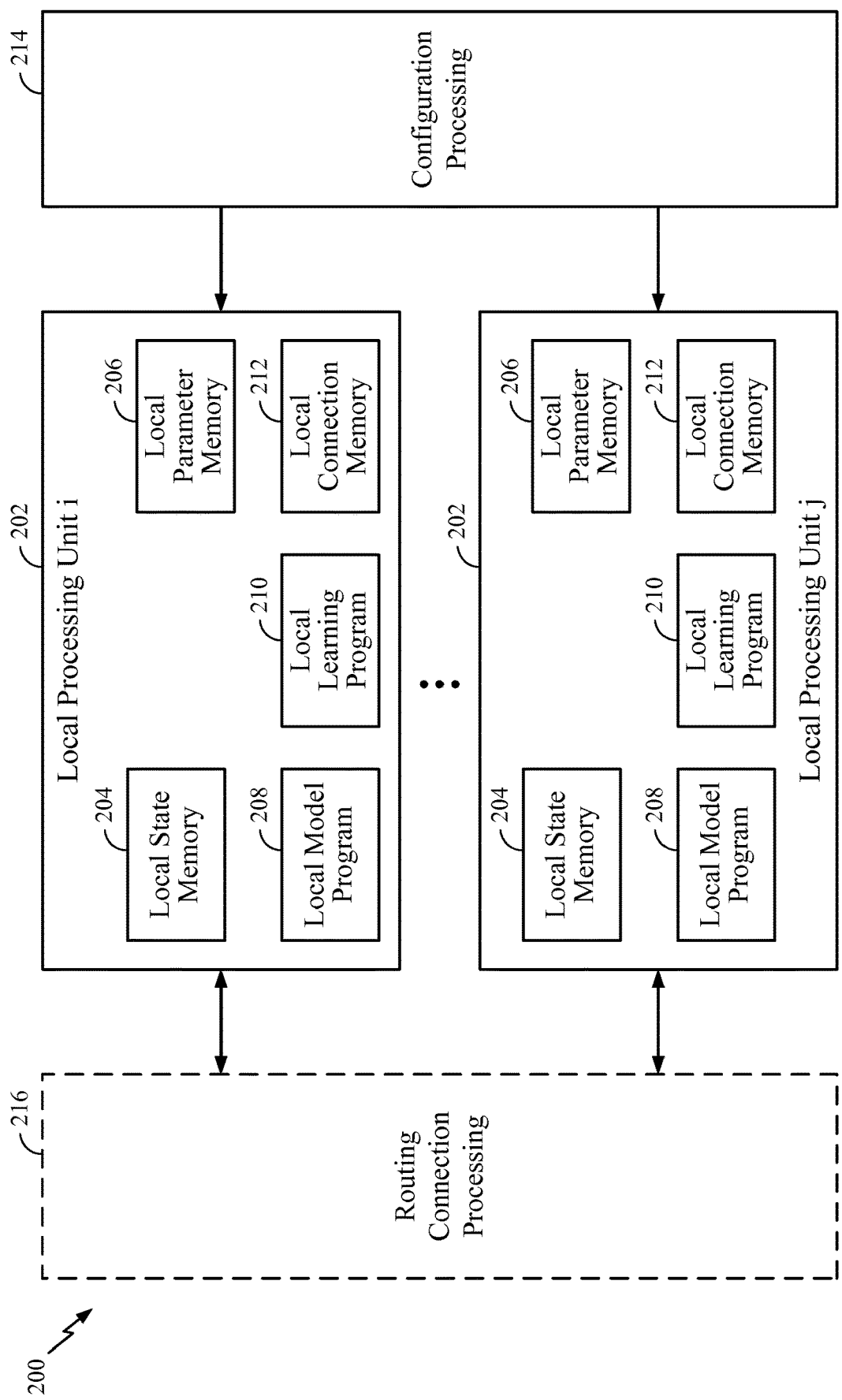
FIG. 2 illustrates an example implementation of a system in accordance with aspects of the present disclosure.

FIG. 2 illustrates an example implementation of a neural network 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures are a class of neural network architecture that may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered. For instance, the Feature Maps 104, shown in FIG. 1A may be designed by human engineers or may be learned by a neural network using deep learning.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
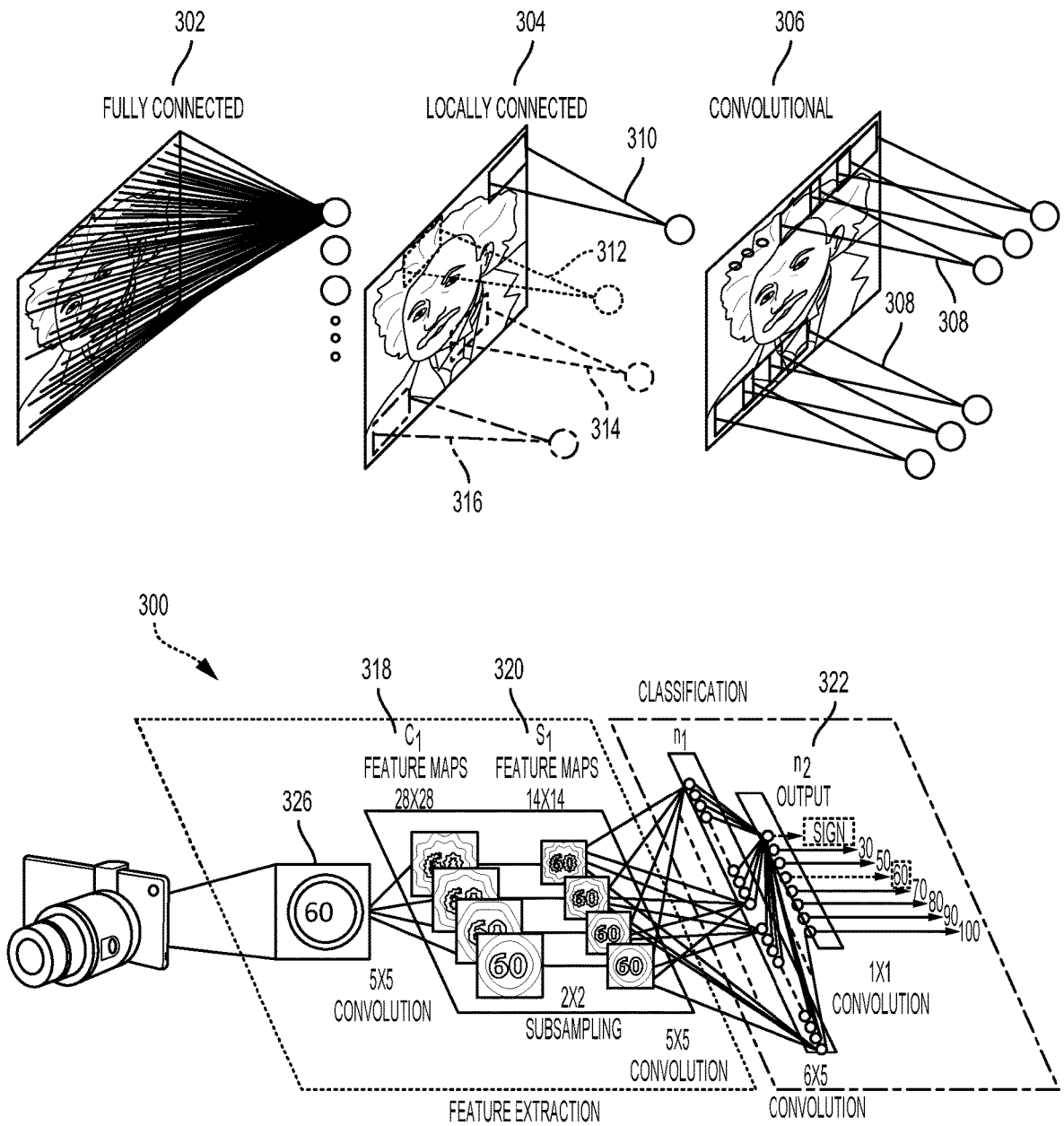
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep Convolutional Networks (DCNs) are networks of convolutional networks, configured with additional pooling and normalization layers. DCNs have achieved state-of-the-art performance on many tasks. DCNs can be trained using supervised learning wherein both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
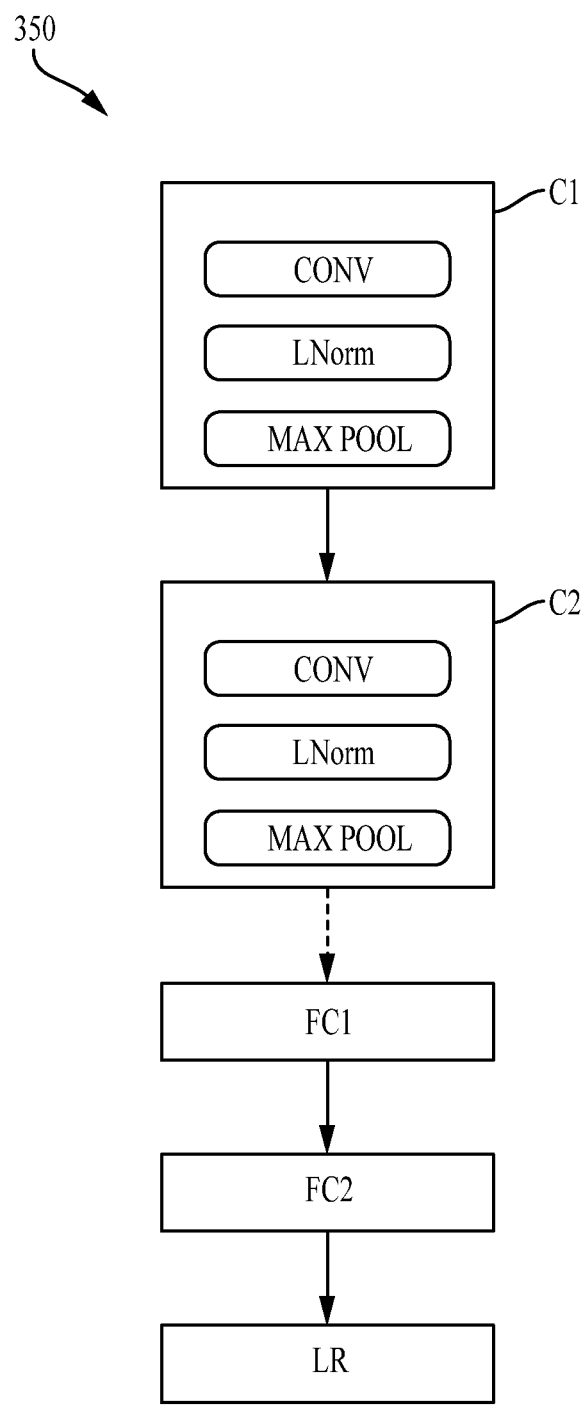
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 152 or GPU 154 of an SOC 150, optionally based on an ARM instruction set, to achieve high performance and low power consumption. In alternative embodiments, the parallel filter banks may be loaded on the DSP 156 or an ISP 166 of an SOC 150. In addition, the DCN may access other processing blocks that may be present on the SOC 150, such as processing blocks dedicated to sensors 164 and navigation 170.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
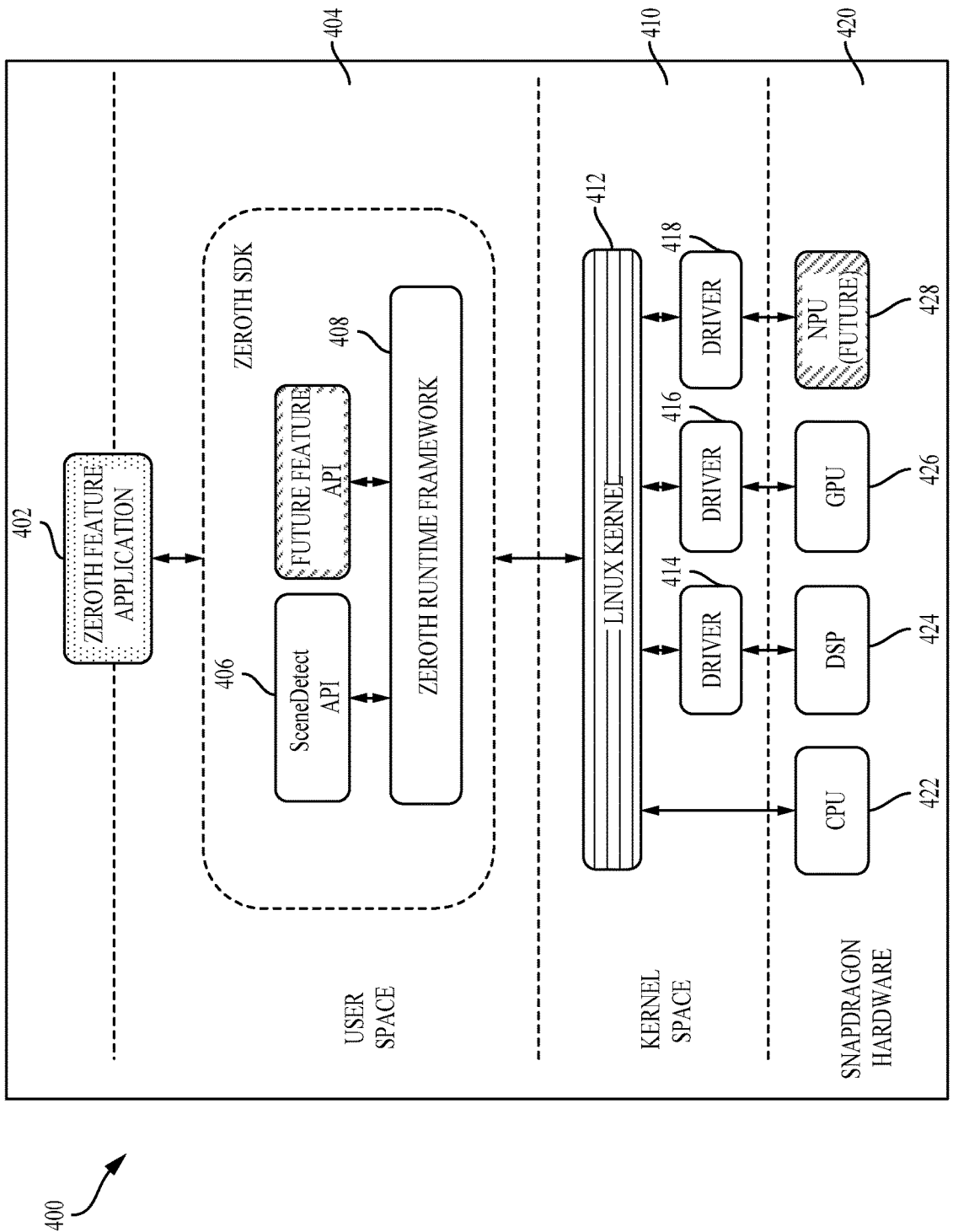
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
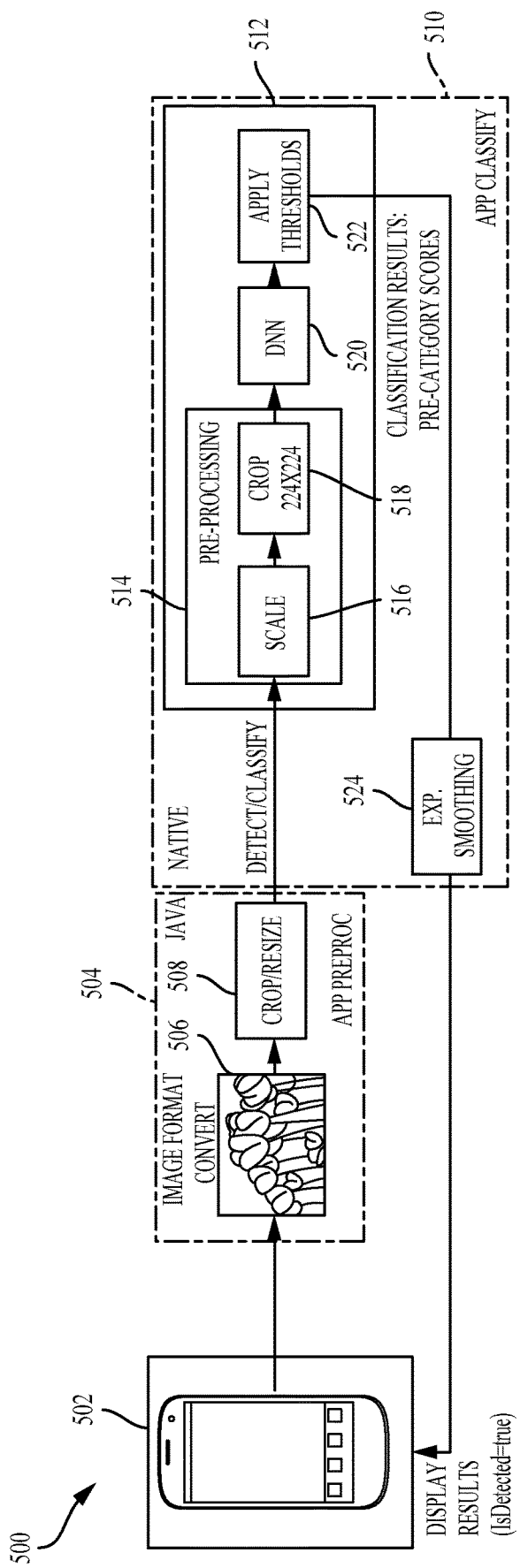
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 150 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a computational network is configured for calculating one or both of a first similarity metric and a second similarity metric, and selectively storing a new training sample in memory based on the first similarity metric and/or the second similarity metric. The computational network includes calculating means and means for selectively storing a new training sample. In one aspect, the calculating means and/or means for selectively storing a new training sample may be the general-purpose processor 152, program memory associated with the general-purpose processor 152, memory block 168, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the neural network based upon desired one or more functional features of the neural network, and to develop the one or more functional features towards the desired functional features as the determined parameters are further adapted, tuned and updated.

Figure 6A:
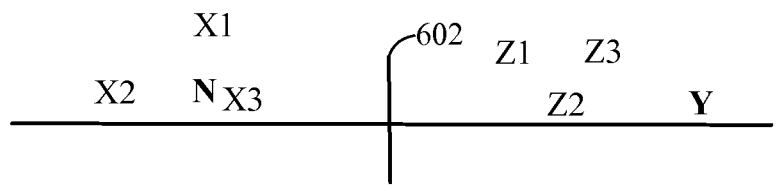
FIGS. 6A-C are exemplary training sets in accordance with aspects of the present disclosure.
Figure 6B:
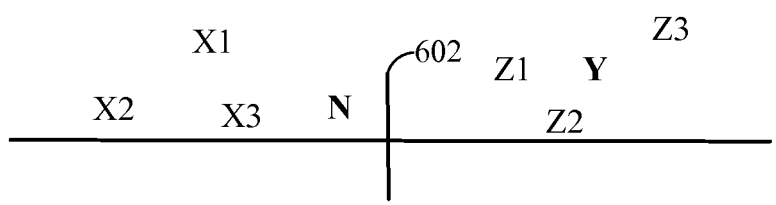
Figure 6C:
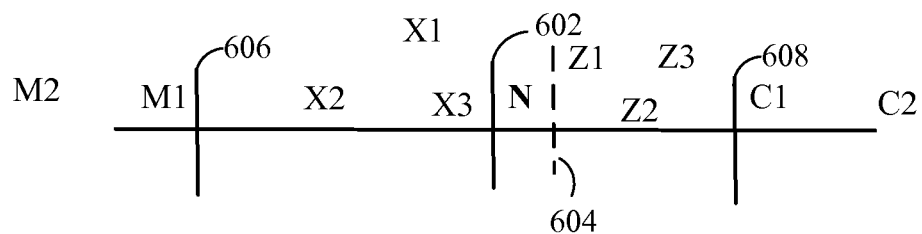

FIGS. 6A-C are exemplary training sets in accordance with aspects of the present disclosure. Referring to FIGS. 6A-C, multiple data samples or points (e.g., X1, X2, X3 and Z1, Z2, Z3) are shown. Only three points are shown in each class, however, this is merely for ease of illustration and not limiting. The points may be organized according to classification, which may be designated by hyperplanes or decision boundaries (e.g., 602, 604, 606, and 608). In FIG. 6A, a new data sample N is presented for addition to the training set. The new data sample N, however, is very near point X3. Using the redundancy criterion described above, a determination may be made on whether to add the new data sample N.

The minimum distance between the points (samples) within the class may be determined (e.g., the distance between X1-X2, X1-X3, and X2-X3). The minimum distance value from these measures may be determined (the pre-existing minimum distance) and may be compared to the smallest distance between the new sample and the existing samples. In this example, the distance between N-X3 is smaller than the preexisting minimum distance. Accordingly, the new sample N may be determined to be redundant and may be rejected.

On the other hand, new data sample Y is not near any of the existing samples within the Z class. The minimum distance between the existing points Z1, Z2 and Z3 may be calculated and compared to the minimum distance between the new point Y and the existing points. In this case, the minimum distance between new point Y and the existing points is greater than the preexisting minimum distance such that new point Y is not redundant and may be added.

In FIG. 6B, the far out criterion described above may be used to determine whether to add new points N and Y to their respective classes. In this example, the sum distance between point N and the other three points would be computed and compared to the sum distances for the other three points. So, the sum-distance (N-X3+N-X2+N-X1) would be compared to the existing sum distances (X3-X1+X3-X2+X3-N), (X2-X1+X2-X3+X2-N), and (X1-X2+X1-X3+X1-N). Because N is outside the existing class boundary formed by the three points, X1, X2, and X3, its sum distance will be larger than the other three and the point will be kept. Point Y would be rejected because its sum distance would be less than that other the three existing Z points.

In FIG. 6C, the neighboring class criterion may be used to determine whether to add a new point to a class. As shown in FIG. 6C, new point N is between the Z class points and the X class points. If added, new point N could provide information useful for clarifying the decision boundary, which may produce more accurate classification results. Using the neighboring class criterion, the adjacency matrix between the class of interest's samples (Z class) and all of the other class' samples (e.g., X class samples, M class samples, and C class samples) may be computed. The proximity of the new sample N to points of X class may be compared to a proximity of the new sample to any of the preexisting points (M, C and Z class points). Because the minimum distance between the new point N and X class point X3 is less than the minimum distance between any of the pre-existing points, new point N is closest to the X class boundary. New point N provides further information such that the decision boundary may also be updated (e.g., moved from boundary 602 to new boundary 604). Accordingly, greater classification accuracy may be achieved by adding new point N.

When a class size limitation is used, any of the criterions described herein may also be used remove a point when adding the new point would exceed the limit. It is noted that the above examples are presented in two dimensions for ease of explanation. The present concepts equally apply to three or more dimensions.

Figure 7:
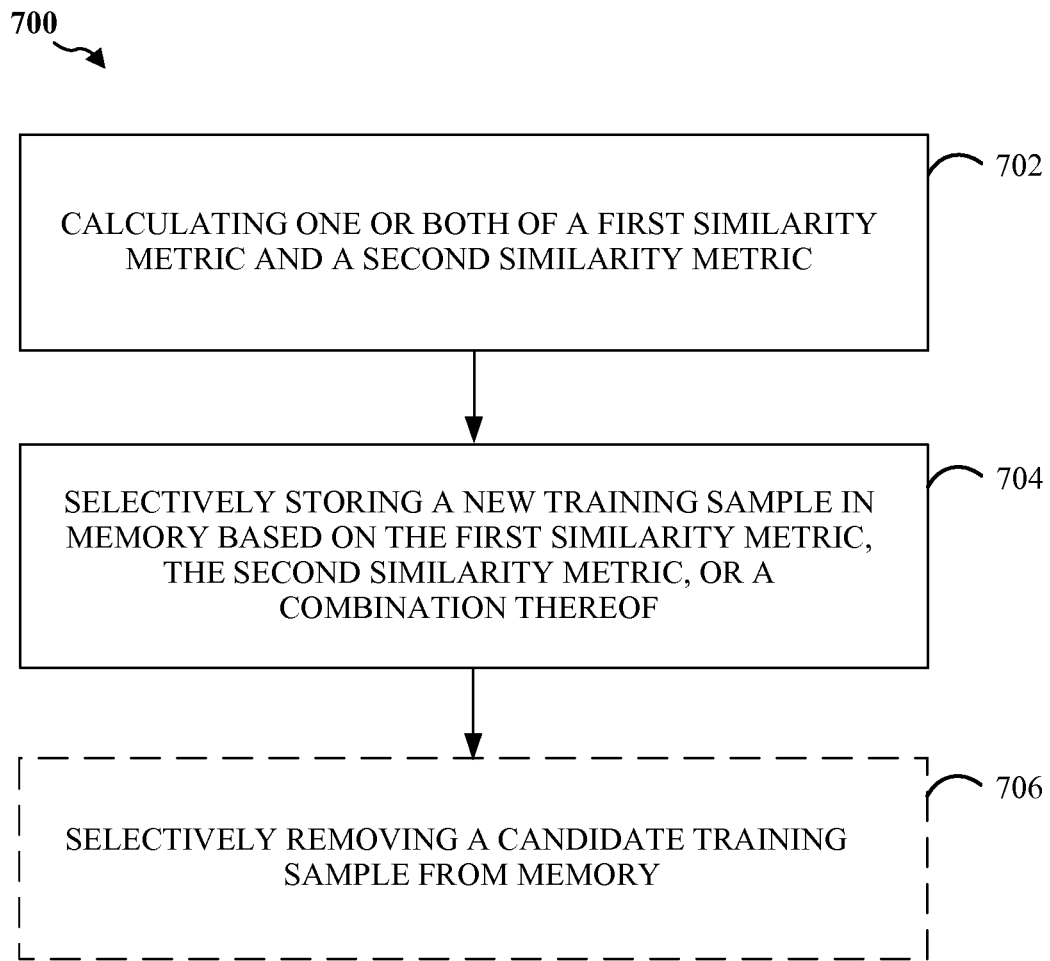
FIGS. 7 and 8 are flow diagrams illustrating methods for managing memory usage of a stored training set for classification in accordance with aspects of the present disclosure.

FIG. 7 illustrates a method 700 for managing memory usage of a stored training set for classification. In block 702, the process calculates one or both of a first similarity metric and a second similarity metric. The first similarity metric is associated with a new training sample and existing training samples of a same class as the new training sample. The second similarity metric is associated with the new training sample and existing training samples of a different class than the new training sample.

In some aspects, the first similarity metric may be based on a proximity of a new sample to a classification boundary within the training set. For instance, the first similarity metric may comprise a difference between a minimum distance between any two points of the existing training samples in a class, and a minimum distance between points of the new training sample and all existing training samples in the class.

In another example, the first similarity metric may comprise a difference between a maximum summed distance between any point of the existing training samples in the class, and a maximum summed distance between points of the new training sample and all of the existing training samples in the same class.

In yet another example, the second similarity metric may comprise a difference between a maximum summed distance between each point of the existing training samples in a class and all existing training samples in the other classes, and a maximum summed distance between points of the new training sample in the class and all existing training samples in the other classes.

In some aspects, the first similarity metric and/or the second similarity metric may be computed based on a centroid of the existing training samples.

In block 704, the process selectively stores the new training sample in memory based on the first similarity metric, the second similarity metric or a combination thereof. By selectively storing the new training sample, the memory requirement for the updated stored training set may be decreased.

Furthermore, in block 706, the process may, in some aspects, selectively remove a candidate training sample from memory based on similarity metrics associated with the candidate training sample and existing training samples. A third similarity metric and/or a fourth similarity metric may be calculated. The third similarity metric is associated with the candidate training sample and existing training samples of a same class as the candidate training sample. The fourth similarity metric is associated with the candidate training sample and existing training samples of a different class than the candidate training sample. The process may selectively remove the candidate training sample based on the third similarity metric and/or the fourth similarity metric. By selectively removing the candidate training sample, the memory requirement for the updated stored training set may be decreased.

Figure 8:
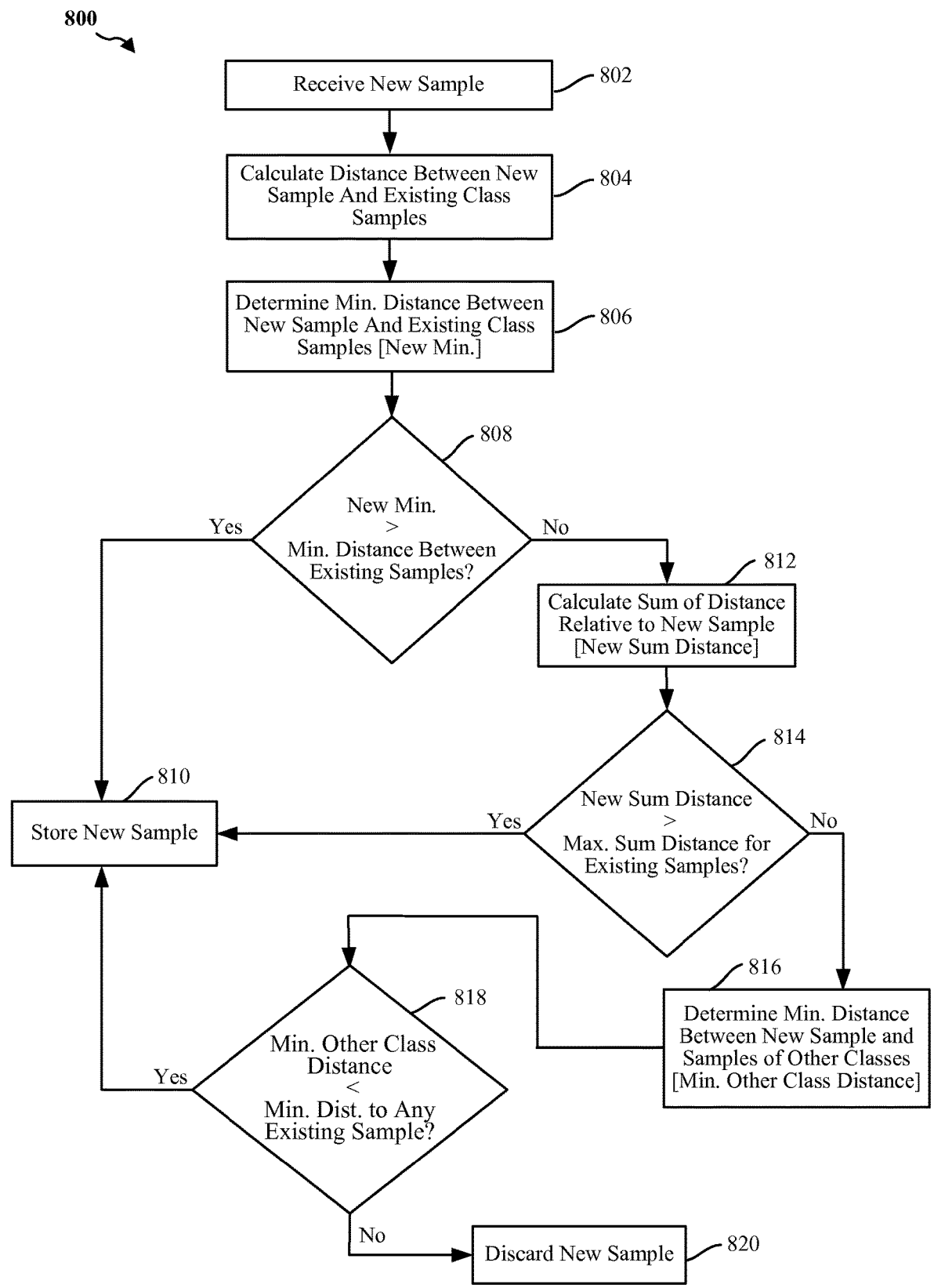

FIG. 8 illustrates a method 800 for managing memory usage of a stored training set for classification. In block 802, the process receives a new sample. In some aspects, one or more training samples may be received sequentially.

In block 804, the process calculates a distance between the new sample and each of the existing samples in the same class. In some aspects, the distance may comprise a Euclidean distance, L2-norm (least squares) Mahalanobis distance, L1-norm (least absolute deviation), cosine distance or other distance metric. In block 806, the process determines a minimum distance between the new sample and the existing samples in the same class. The determined minimum or new minimum is then compared to a minimum distance between each of the existing class samples in block 808. If the new minimum is greater than the minimum distance between the existing class samples, then the new sample may be stored in block 810. Otherwise, the new sample may be redundant and, in block 812, the process may calculate a sum of the distances between the new sample and the existing class samples (from block 804). This new sample sum distance may be compared to a maximum sum distance for the existing samples in block 814. If the new sample sum distance is greater than the maximum sum distance for the existing samples, then the new sample may be stored in block 810. Conversely, if the new sample sum distance is less than the maximum sum distance for the existing samples, the new sample may be further evaluated to determine if addition of the new sample is desirable.

In block 816, the process determines a minimum distance between the new sample and samples of other classes. This new minimum other class distance may be compared with a minimum distance between the new sample and any existing sample in block 818. If the new minimum other class distance is less than the minimum other distance, the new sample may be stored in block 810. Otherwise, in block 820, the new sample may be discarded.

When the new sample is stored in memory, in some aspects, a candidate sample may be removed from memory by evaluating the candidate sample using the similarity metrics as described above or other metrics. Furthermore, the minimum distance between existing samples (block 808), and/or maximum summed distance between existing samples (block 814) may be updated and stored in memory for use in evaluating the addition or removal of samples.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of managing memory usage of an artificial neural network, comprising:
   receiving, after training the artificial neural network with a first set of existing training samples of an existing training set, a new training sample at a device, the new training sample having a same class as the first set of existing training samples in the existing training set stored in a memory of the device;
   calculating at least one of a first similarity metric or a second similarity metric for the new training sample, wherein the first similarity metric is associated with a first distance between the new training sample and the first set of existing training samples of the same class as the new training sample, and wherein the second similarity metric is associated with a second distance between the new training sample and a second set of existing training samples, in the existing training set, of a different class than the new training sample;
   selectively updating the first set of existing training samples to include the new training sample based on the first similarity metric or the second similarity metric, wherein updating the first set of existing training samples comprises:
      selecting an existing training sample from the first set of existing training samples for removal from the memory when updating the first set of existing training samples would cause the memory to exceed a capacity threshold, the selected existing training sample having a smallest sum distance to each point of the first set of existing training samples of the different class in comparison to a sum distance for other existing training samples of the first set of existing training samples; and
      removing the selected existing training sample from the memory; and
   retraining the artificial neural network with the updated first set of existing training samples.

2. The method of claim 1, in which the existing training sample is selected based on a bias for retaining the first set of existing training samples according to a proximity to the second set of existing training samples.

3. The method of claim 1, wherein at least one of the first similarity metric or the second similarity metric are computed based at least in part on a centroid of the first set of existing training samples.

4. The method of claim 1, wherein the first similarity metric comprises a difference between: a minimum distance between any two points of the first set of existing training samples, and a minimum distance between points of the new training sample and all training samples of the first set of existing training samples.

5. The method of claim 1, wherein the first similarity metric comprises a difference between: a maximum summed distance between any two points of the first set of existing training samples, and a maximum summed distance between points of the new training sample and all training samples of the first set of existing training samples.

6. The method of claim 1, wherein:
   the first similarity metric comprises a maximum summed distance between each point of the first set of existing training samples and all other sets of existing training samples in other classes,
   the second similarity metric comprises a maximum summed distance between points of the new training sample and all other sets of existing training samples in the other classes, and
   the new training sample is selectively added to the first set of existing training samples based at least in part on a difference between the first similarity metric and the second similarity metric.

7. An apparatus for managing memory usage of an artificial neural network, comprising:

means for receiving, after training the artificial neural network with a first set of existing training samples of an existing training set, a new training sample at the apparatus, the new training sample having a same class as the first set of existing training samples in the existing training set stored in a memory of the apparatus;

means for calculating at least one of a first similarity metric or a second similarity metric for the new training sample, wherein the first similarity metric is associated with a first distance between the new training sample and the first set of existing training samples of the same class as the new training sample, and wherein the second similarity metric is associated with a second distance between the new training sample and a second set of existing training samples, in the training set, of a different class than the new training sample;

means for selectively updating the first set of existing training samples to include the new training sample based on the first similarity metric or the second similarity metric, wherein updating the first set of existing training samples comprises:

selecting an existing training sample from the first set of existing training samples for removal from the memory when updating the first set of existing training samples would cause the memory to exceed a capacity threshold, the selected existing training sample having a smallest sum distance to each point of the first set of existing training samples of the different class in comparison to a sum distance for other existing training samples of the first set of existing training samples; and removing the selected existing training sample from the memory; and means for retraining the artificial neural network with the updated first set of existing training samples.

8. The apparatus of claim 7, in which the existing training sample is selected based on a bias for retaining the first set of existing training samples according to a proximity to the second set of existing training samples.

9. The apparatus of claim 7, wherein at least one of the first similarity metric or the second similarity metric are computed based at least in part on a centroid of the first set of existing training samples.

10. The apparatus of claim 7, wherein the first similarity metric comprises a difference between: a minimum distance between any two points of the first set of existing training samples, and a minimum distance between points of the new training sample and all training samples of the first set of existing training samples.

11. The apparatus of claim 7, wherein the first similarity metric comprises a difference between: a maximum summed distance between any two points of the first set of existing training samples, and a maximum summed distance between points of the new training sample and all training samples of the first set of existing training samples.

12. The apparatus of claim 7, wherein:

the first similarity metric comprises a maximum summed distance between each point of the first set of existing training samples and all other sets of existing training samples in other classes, the second similarity metric comprises a maximum summed distance between points of the new training sample and all other sets of existing training samples in the other classes, and the new training sample is selectively added to the first set of existing training samples based at least in part on a difference between the first similarity metric and the second similarity metric.

13. An apparatus for managing memory usage of an artificial neural network, comprising:

a memory; and at least one processor coupled to the memory and configured:

to receive, after training with a first set of existing training samples of an existing training set, a new training sample at the apparatus, the new training sample having a same class as the first set of existing training samples in the existing training set stored in a memory of the apparatus;

to calculate at least one of a first similarity metric or a second similarity metric for the new training sample, wherein the first similarity metric is associated with a first distance between the new training sample and the first set of existing training samples of the same class as the new training sample, and wherein the second similarity metric is associated with a second distance between the new training sample and a second set of existing training samples, in the training set, of a different class than the new training sample;

to selectively update the first set of existing training samples to include the new training sample based on the first similarity metric or the second similarity metric, wherein updating the first set of existing training samples comprises:

selecting an existing training sample from the first set of existing training samples for removal from the memory when updating the first set of existing training samples would cause the memory to exceed a capacity threshold, the selected existing training sample having a smallest sum distance to each point of the first set of existing training samples of the different class in comparison to a sum distance for other existing training samples of the first set of existing training samples; and removing the selected existing training sample from the memory; and to retrain the artificial neural network with the updated first set of existing training samples.

14. The apparatus of claim 13, in which the existing training sample is selected based on a bias for retaining the first set of existing training samples according to a proximity to the second set of existing training samples.

15. The apparatus of claim 13, wherein the at least one processor is further configured to calculate at least one of the first similarity metric or the second similarity metric based at least in part on a centroid of the first set of existing training samples.

16. The apparatus of claim 13, wherein the first similarity metric comprises a difference between: a minimum distance between any two points of the first set of existing training samples, and a minimum distance between points of the new training sample and all training samples of the first set of existing training samples.

17. The apparatus of claim 13, wherein the first similarity metric comprises a difference between: a maximum summed distance between any two points of the first set of existing training samples, and a maximum summed distance between points of the new training sample and all training samples of the first set of existing training samples.

18. The apparatus of claim 13, wherein:
the first similarity metric comprises a maximum summed distance between each point of the first set of existing training samples and all other sets of existing training samples in other classes,
the second similarity metric comprises a maximum summed distance between points of the new training sample and all other sets of existing training samples in the other classes, and
the at least one processor being configured to update the first set of existing training samples to include the new training sample based at least in part on a difference between the first similarity metric and the second similarity metric.

19. A non-transitory computer-readable medium having program code recorded thereon for managing memory usage of an artificial neural network, the program code being executed by a processor and comprising:
program code to receive, after training the artificial neural network with a first set of existing training samples of an existing training set, a new training sample at a device, the new training sample having a same class as the first set of existing training samples in the existing training set stored in a memory of the device;
program code to calculate at least one of a first similarity metric or a second similarity metric for the new training sample, wherein the first similarity metric is associated with a first distance between the new training sample and the first set of existing training samples of the same class as the new training sample, and wherein the second similarity metric is associated with a second distance between the new training sample and a second set of existing training samples, in the training set, of a different class than the new training sample;
program code to selectively update the first set of existing training samples to include the new training sample based on the first similarity metric or the second similarity metric, wherein updating the first set of existing training samples comprises:
selecting an existing training sample from the first set of existing training samples for removal from the memory when updating the first set of existing training samples would cause the memory to exceed a capacity threshold, the selected existing training sample having a smallest sum distance to each point of the first set of existing training samples of the different class in comparison to a sum distance for other existing training samples of the first set of existing training samples; and
removing the selected existing training sample from the memory; and
program code to retrain the artificial neural network with the updated first set of existing training samples.

20. The computer-readable medium of claim 19, in which the existing training sample is selected based on a bias for retaining the first set of existing training samples according to a proximity to the second set of existing training samples.

21. The computer-readable medium of claim 19, further comprising program code to calculate at least one of the first similarity metric or the second similarity metric which are computed based at least in part on a centroid of the first set of existing training samples.

22. The computer-readable medium of claim 19, wherein the first similarity metric comprises a difference between: a minimum distance between any two points of the first set of existing training samples, and a minimum distance between points of the new training sample and all training samples of the first set of existing training samples.

23. The computer-readable medium of claim 19, wherein the first similarity metric comprises a difference between: a maximum summed distance between any two points of the first set of existing training samples, and a maximum summed distance between points of the new training sample and all training samples of the first set of existing training samples.

24. The computer-readable medium of claim 19, wherein:
the first similarity metric comprises a maximum summed distance between each point of the first set of existing training samples and all other sets of existing training samples in other classes,
the second similarity metric comprises a maximum summed distance between points of the new training sample and all other sets of existing training samples in the other classes, and
further comprising program code to selectively update the first set of existing training samples to include the new training sample based at least in part on a difference between the first similarity metric and the second similarity metric.

\* \* \* \* \*